H. BURNET.
SPARE TIRE CARRIER FOR AUTOMOBILES.
APPLICATION FILED AUG. 17, 1915.
1,207,493.
Patented Dec. 5, 1916.
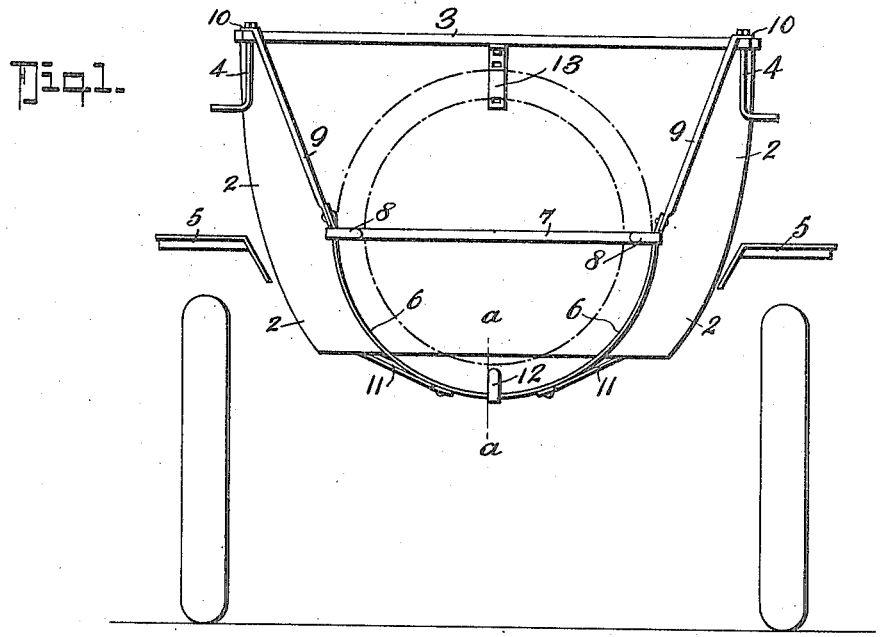
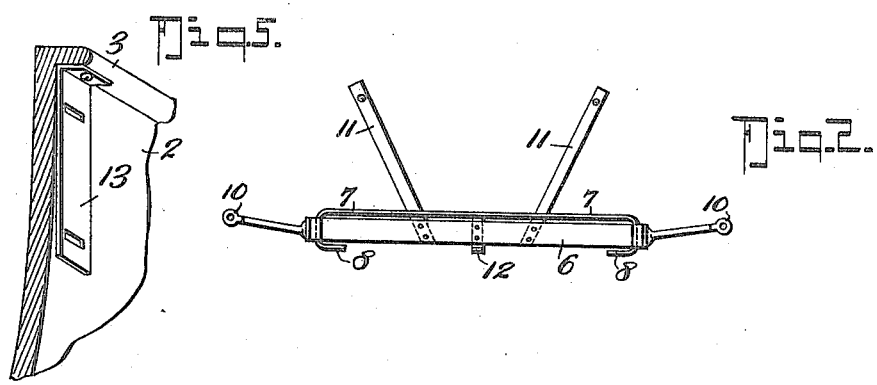
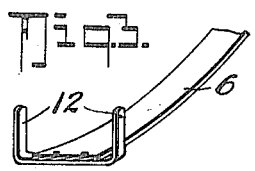
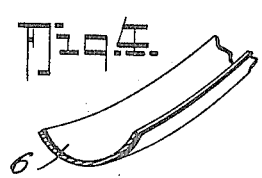
WITNESS.
Charles J. Diller.
INVENTOR
Harold Burnet.
BY
Fred G. Dieterich & Co.
ATTORNEYS

UNITED STATES PATENT OFFICE.

HAROLD BURNET, OF PORT HANEY, BRITISH COLUMBIA, CANADA.

SPARE-TIRE CARRIER FOR AUTOMOBILES.

1,207,493.

Specification of Letters Patent. Patented Dec. 5, 1916.

Application filed August 17, 1915. Serial No. 45,891.

*To all whom it may concern:*

Be it known that I, HAROLD BURNET, a citizen of the Dominion of Canada, residing at Port Haney, in the Province of British Columbia, Canada, have invented certain new and useful Improvements in Spare-Tire Carriers for Automobiles, of which the following is a specification.

This invention relates to a supplemental tire carrier for an auto-vehicle, which has been particularly designed for application to the rear of a vehicle of the Ford class, the object being to provide a carrier that is simple and cheap to manufacture, that can readily be applied to existing fixtures of the vehicle to sustain the tire in a vertical position, and that is neat in appearance and strong to perform the service required.

The invention is particularly described in the following specification, reference being made to the drawings by which it is accompanied, in which:

Figure 1 is a face view of the carrier as applied to the back of an auto-vehicle. Fig. 2, a plan of the same removed from the vehicle. Fig. 3 is a detail cross section of the carrier at *a—a* in Fig. 1. Fig. 4, a cross section showing a modified form, and Fig. 5, an enlarged detail of the upper guard of the body.

In these drawings 2 represents the back portion of the body of an auto-vehicle, 3 being the upper bead of the same, 4 the rest brackets for the cover on each side and 5 the mud guards of the rear wheels.

The tire carrier which is the subject of this application, is suspended vertically behind the body from the rest brackets 4 and the lower part is stayed to the underside of the body 2. It comprises a half hoop 6 which is bent from thin flat bar iron to the curvature of the outside of the tire. To each outwardly angled end of this half hoop 6 is secured a suspension rod 9 the upper end of which is formed into a washer eye 10 and bent to bear upon the upper side of the rest bracket 4 and be secured under its nut. Just below the attachment of the suspension rod the ends of the half hoop are tied together by a light flat bar 7 extending across the back and bent around the width of 6 to project across the front, as at 8, to form a retaining clip on each side for the tire as it rests within the carrier. At the bottom of the half hoop a retaining clip 12 is secured.

The lower part of the carrier is braced to the under side of the body by two braces 11 riveted to the lower part of the half hoop, one on each side of the middle and which are outwardly angled, and secured to the under side of the body 2 by bolts or wood screws.

To prevent the upper part of a tire in the carrier resting against the body 2, and to provide an attachment for this part, a light metal support 13 is secured by a screw to the underside of the bead 3 and projects vertically downward, see Fig. 5. This support is slotted to receive a tie strap by which the tire is fastened in the carrier.

The metal of the hoop 6 may be bent to a cross section similar to what is shown in Fig. 4, in which case it will have sufficient rigidity to render unnecessary the tying of the ends together by the rod 7 and will enable the retaining clips 8 and 12 to be dispensed with.

It will be observed that the weight of the carrier and its tire is directly sustained by the suspension rods 9 from the upper part of the body of the vehicle, while the braces 11 effectively stay the lower part against swing or vibration in a fore and aft or lateral direction, for which latter they are well angled outward. The ends of the half hoop are retained against spreading outward by the tie 7 where such is used, or by the rigidity imparted by the cross section shown in Fig. 4.

The carrier is simple and cheap to manufacture, and being attached to existing fixtures can be applied in a few minutes to a car. It is neat in appearance and the retaining clips 8 and 12 or the bent cross section shown in Fig. 4 are sufficient to hold the tire in the carrier without further fastening than the strap applied to the support 13.

The same general construction may be modified to enable two tires to be regularly carried if found necessary, or if two are required only for an emergency the extra one may conveniently be carried behind the regular one, the underside resting on the spread of the braces 11.

Having now particularly described my invention, I hereby declare that what I claim as new and desire to be protected in by Letters Patent, is:

1. A spare tire carrier for an auto-vehicle, said carrier comprising a half hoop bent from thin metal, means coöperative with the rest brackets for the top for suspending the ends of this half hoop from the upper part of the body of the vehicle on each side of the back, and means for bracing the lower part of the hoop from the underside of the body.

2. A spare tire carrier for an auto-vehicle, said carrier comprising a half hoop bent from thin metal, means coöperative with the rest brackets for the top for suspending the ends of this half hoop from the upper part of the body of the vehicle on each side of the back, and a brace from the lower part of the hoop on each side of the middle to the underside of the vehicle, said braces being laterally angled outward.

3. A spare tire carrier for an auto-vehicle, said carrier comprising a half hoop bent from thin metal the ends of which are connected by a cross tie, a suspension rod secured to each end of the half hoop each rod being angled outward and provided with a washer eye to fit under the nut of the cover rest of the vehicle, and means for bracing the lower part of the half hoop to the underside of the vehicle, said braces being angled outward to their attachment to the vehicle.

4. A spare tire carrier for an auto-vehicle, said carrier comprising a half hoop bent from thin metal, means for suspending this half hoop from the upper edge of the body of the vehicle, and means for bracing the lower part of it from the underside of the body, said braces being angled outward to afford lateral support, and a tire attachment secured to and projecting downward from the upper edge of the body.

5. A spare tire carrier for an auto-vehicle, said carrier comprising a half hoop bent from thin metal, a tie across the back between the ends of this half hoop the ends of which tie after attachment to the hoop are bent around the front of it to form tire retaining clips, a tire retaining clip secured to the middle of the half hoop and projecting radially inward from it, a suspension rod secured to each end of the half hoop and angled outward therefrom and provided with a washer eye to pass under the nut of a cover rest of the vehicle, a brace secured to the underside of the half hoop on each side of the middle and angled upward and outward for attachment to the underside of the body of the car and an upper tire guard secured to and projecting vertically downward from the upper lip of the body, said guard having provision for attachment of the tire thereto.

6. A spare tire carrier for an auto-vehicle, said carrier comprising a half hoop bent from thin metal, means for preventing the open ends of the half hoop from spreading laterally, means for suspending the half hoop by its ends from the upper edge of the vehicle body, means for bracing the lower part of the half hoop from the underside of the vehicle body, and means for preventing a tire in the carrier from contacting with the body of the vehicle, said means having provision for attachment of the upper part of the tire thereto.

In testimony whereof I affix my signature.

HAROLD BURNET.

Copies of this patent may be obtained for five cents each, by addressing the "Commissioner of Patents, Washington, D. C."